United States Patent
Sturza et al.

(10) Patent No.: US 8,462,831 B2
(45) Date of Patent: Jun. 11, 2013

(54) SYSTEM AND METHOD FOR USE OF SIEVING IN GPS SIGNAL ACQUISITION

(75) Inventors: Mark Sturza, Encino, CA (US); Paul Underbrink, Lake Forest, CA (US)

(73) Assignee: CSR Technology, Inc., Sunnyvale, CA (US)

(*) Notice: Subject to any disclaimer, the term of this patent is extended or adjusted under 35 U.S.C. 154(b) by 992 days.

(21) Appl. No.: 12/508,278

(22) Filed: Jul. 23, 2009
(Under 37 CFR 1.47)

(65) Prior Publication Data

US 2011/0021171 A1    Jan. 27, 2011

(51) Int. Cl.
*H04B 1/00* (2006.01)
(52) U.S. Cl.
USPC ........... 375/148; 375/147; 375/140; 375/130; 375/295; 375/316; 370/319; 370/320; 370/321; 370/330; 370/335; 370/342; 370/345; 370/347
(58) Field of Classification Search
USPC .. 375/148, 147, 140, 130, 295, 316; 370/319, 370/320, 321, 330, 335, 342, 345, 347
See application file for complete search history.

(56) References Cited

U.S. PATENT DOCUMENTS

| 2003/0076910 A1* | 4/2003 | Van Wechel et al. ......... 375/354 |
| 2009/0052506 A1* | 2/2009 | Valio et al. .................... 375/150 |

\* cited by examiner

*Primary Examiner* — Zewdu Kassa
(74) *Attorney, Agent, or Firm* — Haynes and Boone LLP

(57) ABSTRACT

Systems and methods are disclosed herein to use sieving to reduce the number of hypotheses and the length of time for acquisition of GPS satellite signals. In sieving, hypothesis testing is performed after a short non-coherent integration duration on a first set of hypotheses. At the end of the non-coherent integration time, multiple candidate hypotheses having high likelihood of signal detection are identified. Further non-coherent integration of each candidate hypothesis is performed by using a tracking loop to remove Doppler frequency and code phase variations on the signal. In parallel, additional hypotheses testing is performed on a second set of hypotheses. At the end of the next non-coherent integration time, the best candidate hypotheses among the candidate hypotheses sieved from the first set of hypotheses running in the tracking loops and the candidate hypotheses from the second set of hypotheses are identified. This new set of candidate hypotheses replaces the previous candidate hypotheses and is tracked by the tracking loops. This process of short non-coherent integrations followed by track is repeated until a candidate hypothesis has a non-coherent integration that exceeds a detection threshold.

20 Claims, 3 Drawing Sheets

Satellite Navigation Receiver With Sieving Search Module

Satellite Navigation Receiver With Sieving Search Module

Sieving Search Module Functional Block Diagram

Sieving Track Channel Functional Block Diagram

SYSTEM AND METHOD FOR USE OF SIEVING IN GPS SIGNAL ACQUISITION

TECHNICAL FIELD

The present disclosure relates generally to a system and a method for use of sieving to acquire satellite signals in a satellite navigation receiver. Specifically, the present disclosure relates to a system and a method for use of sieving to reduce the number of hypothesis tests and the length of time required for satellite acquisition in a satellite navigation receiver.

BACKGROUND

Satellite-based positioning systems include constellations of earth orbiting satellites that constantly transmit orbit information and ranging signals to receivers. An example of a satellite-based positioning system is the Global Positioning System (GPS), with its constellation of GPS satellites. Orbit information and ranging signals transmitted by the GPS satellites are received by GPS receivers. To determine its position, a GPS receiver acquires and tracks satellite signals from three or more GPS satellites to measure a range from the GPS receiver to each satellite and to demodulate the transmitted orbit information. Transmissions of GPS satellite signals are modulated by a satellite-specific 1023-chip pseudo-random number (PRN) code that is repeated every millisecond. Transmissions of satellite signals from all GPS satellites are also synchronized. At the GPS receiver, a code phase of the satellite signal is received with a delay corresponding to the time it takes for the satellite signal to travel from the satellite to the receiver. By measuring the delays in the code phase to three or more satellites and by knowing the positions of the satellites, the GPS receiver is able to determine its position. The received satellite signal is also frequency shifted by a Doppler frequency due to the relative motion between the satellite and the GPS receiver and also due to a receiver oscillator error. The GPS receiver acquires a satellite by searching for the satellite's PRN code in a two-dimensional search space divided into multiple code phase/Doppler frequency test hypotheses.

In a conventional acquisition process, one correlation resource is allocated to each code phase/Doppler frequency hypothesis. The correlation resource integrates the cross-correlation energy of the hypotheses with the received satellite signal. Cross-correlation using the correlation resources continues until one of the cross-correlation energies exceeds a threshold which indicates that the signal has been detected using the corresponding hypothesis. Generally, a satellite signal with a low signal level requires long non-coherent integration time for reliable detection. However, long non-coherent integration time may present a problem. For example, when there is an uncompensated receiver clock frequency rate, the apparent Doppler frequency of the received satellite signal may change during the long non-coherent integration time, causing the satellite signal to move across hypotheses. The cross correlation energy may then be degraded, resulting in an increased probability of missed detection. In addition, where there are a large number of hypotheses used to search for signals in a large search space, long non-coherent integration time may result in expenditure of significant energy, leading to reduced battery life. Therefore, it is desirable to find ways to reduce the number of hypotheses, especially when acquiring satellite signal with low signal levels.

BRIEF SUMMARY

Systems and methods are disclosed herein to use what is referred to as sieving to reduce the number of hypotheses and the length of time for acquisition of GPS satellite signals. In sieving, hypothesis testing is performed after a short non-coherent integration duration for a first set of hypotheses. At the end of the non-coherent integration time, multiple candidate hypotheses having high likelihood of signal detection are identified. Further non-coherent integration for each candidate hypothesis is performed by using a tracking loop to remove Doppler frequency and code phase variations on the signal. In parallel, additional hypothesis testing is performed on a second set of hypotheses. At the end of the next non-coherent integration time, the best candidate hypotheses among the candidate hypotheses sieved from the first set of hypotheses running in the tracking loops and the candidate hypotheses from the second set of hypotheses are identified. This new set of candidate hypotheses replaces the previous candidate hypotheses and is tracked by the tracking loops. This process of a short non-coherent integration for a set of hypotheses followed by sieving and tracking of the most promising candidate hypotheses is repeated until a candidate hypothesis has a non-coherent integration that exceeds a detection threshold.

In accordance with one or more embodiments of the present disclosure, a sieving system for a satellite navigation receiver includes a plurality of sieving search channels to non-coherently integrate one or more coherent integrations of a correlation of a satellite signal with a plurality of first hypotheses to generate a plurality of non-coherent integrations, a plurality of sieving track channels to track the satellite signal with the plurality of second hypotheses to generate a plurality of extended non-coherent integrations, and a peak selection module to select the plurality of second hypotheses from the plurality of non-coherent integrations and the plurality of extended non-coherent integrations, to select a largest peak from the plurality of non-coherent integrations and the plurality of extended non-coherent integrations, and to declare a detection of the satellite signal when the largest peak exceeds the detection threshold.

In accordance with one or more embodiments of the present disclosure, a method for searching for a satellite signal in a sieving mode in a satellite navigation receiver includes non-coherently integrating one or more coherent integrations of a correlation of the satellite signal with a plurality of first hypotheses to generate a plurality of non-coherent integrations, tracking the satellite signal with a plurality of second hypotheses to generate a plurality of tracked satellite signals, extending the non-coherent integrations of the plurality of second hypotheses through non-coherently integrating one or more coherent integrations of a correlation of the plurality of tracked satellite signals with the plurality of second hypotheses to generate a plurality of extended non-coherent integrations, updating the plurality of second hypotheses from the plurality of non-coherent integrations and the plurality of extended non-coherent integrations, selecting a largest peak from the plurality of non-coherent integrations and the plurality of extended non-coherent integrations to compare with a detection threshold, and declaring a detection of the satellite signal when the largest peak exceeds the detection threshold.

These and other embodiments of the present disclosure will be more fully understood by reference to the following detailed description when considered in conjunction with the following drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
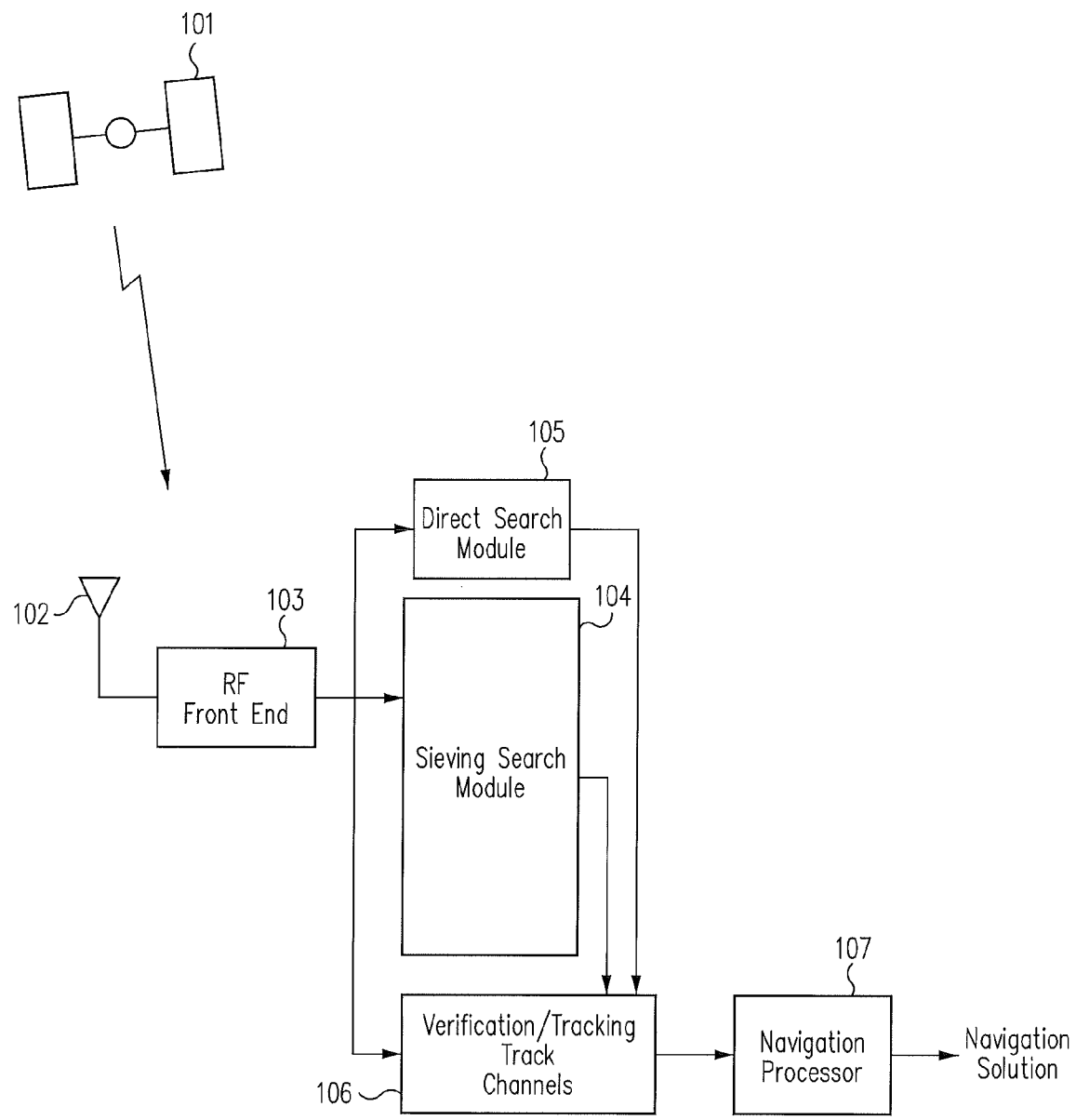
FIG. 1 shows a top level block diagram of a satellite navigation receiver with sieving channels according to one or more embodiments of the present disclosure.

Systems and methods are disclosed for using sieving to reduce the number of search hypotheses based on running shorter non-coherent integration during acquisition of satellite signals by satellite navigation receivers. Reducing the number of search hypotheses allows for a concomitant reduction in power consumption, leading to increased battery life. Additionally, reducing the duration of non-coherent integration mitigates the degradation in the cross correlation energy caused by uncompensated Doppler frequency and code phase variations during long non-coherent integration intervals, leading to higher probability of detection. Sieving is especially adapted for acquisition of satellites with low signal level because of the desirability to reduce the duration of long uncompensated non-coherent integrations normally associated with acquisition of weak signals. For example, sieving may target the acquisition of signal with a coherently integrated SNR (signal to noise ratio) of less than 3 dB.

In sieving, hypotheses' testing is carried out in two stages—a relatively short non-coherent integration interval followed by a longer tracking interval. During the first stage, non-coherent integration is performed to generate the cross correlation energy between the satellite signal and a group of hypotheses. Hypotheses' testing is then performed on the group of cross correlation energy to identify early on those candidates from the group of hypotheses most likely to be the right hypothesis for verification by the second stage. Thus, the first stage sieves the hypotheses to identify the most promising candidate hypotheses for the second stage. Since hypotheses' testing is less reliable using the cross correlation energy from the shorter non-coherent integration interval of the first stage, detection thresholds are reduced and multiple candidate hypotheses are kept. In the second stage, the satellite signal is tracked by a tracking channel for each of the candidate hypotheses to remove Doppler frequency and code phase variation on the signal that may otherwise degrade the cross correlation energy. The tracked signals are then cross correlated with the candidate hypotheses and the cross correlation non-coherently integrated to further build up the cross correlation energy. During tracking of the signal for the candidate hypotheses sieved from the first group of hypotheses, initial non-coherent integration is also performed to generate cross correlation energy for a second group of hypotheses. At the end of the non-coherent integration period for the second group of hypotheses, hypotheses' testing is again performed on the cross correlation energy for the second group of hypotheses to identify the best candidate hypotheses from this second group. Hypotheses' testing is further performed on the cross correlation energy of these candidate hypotheses from the second group and the cross correlation energy of the candidate hypotheses in the tracking channels sieved from the first group to identify the new candidate hypotheses. This new group of candidate hypotheses then becomes the new candidate hypotheses sieved from the first two groups of hypotheses for further verification by the tracking channels. This process is repeated until a cross correlation energy from the non-coherent integrations exceeds a detection threshold, or the process times out. Because the best candidate hypotheses are identified after a relatively short non-coherent integration period and the tracking channels are used to mitigate degradations in the cross correlation energy caused by uncompensated Doppler frequency/code phase variations, the number of hypotheses running long non-coherent integration is reduced.

The new candidate hypotheses undergoing verification in the tracking channels are sieved from the group of hypotheses with cross correlation energy accumulated during the initial non-correlation period and also from old candidate hypotheses with cross correlation energy accumulated with longer non-correlation periods. To enable hypotheses' testing on groups of hypotheses with different non-coherent integration period, the cross correlation energy is computed as a log likelihood ratio. Hypotheses' testing to select the candidate hypotheses for verification by the tracking channels is based on selecting the hypotheses with the maximum log likelihood ratios.

FIG. 1 shows a top level block diagram of a satellite navigation receiver with sieving channels according to one or more embodiments of the present disclosure. Signal from a satellite 101 is received by the antenna of a satellite navigation receiver. The received satellite signal may be filtered, amplified, and down-converted to baseband by a RF front end 103. The output of the RF front end 103 is used to acquire and track the satellite signal. Acquisition of the satellite signal may be carried out by either the sieving search module 104 or the direct search module 105. The sieving search module 104 may be used to acquire satellite signal with low signal level, such as when acquiring signal with a coherently integrated SNR (signal to noise ratio) of less than 3 dB so as to reduce the number of hypotheses running long non-coherent integration. The sieving search module 104 may run until one of the hypotheses crosses a detection threshold, or it may time out when an allotted time has expired without any hypotheses crossing the detection threshold. Alternatively, the direct search module 105 may be used to acquire stronger signal where all the hypotheses run non-coherent integrations until one of the non-coherent integrations crosses a detection threshold or until a time out. Even though the sieving search module 104 and the direct search module 105 are shown as separate modules, they may share the same searching channels to implement the respective sieving and direct search functionalities. After the sieving search module 104 or the direct search module 105 detects the satellite signal for a test hypothesis, the verification/tracking track channels 106 may be used to verify the test hypothesis. Verification of the test hypothesis may involve re-acquiring the satellite signal using the code phase and Doppler frequency associated with the test hypothesis to ascertain that the satellite signal may be detected more than once using the same test hypothesis. Once the hypothesis has been verified, satellite signal may be tracked by the verification/tracking track channels 106 to obtain measurements and to demodulate satellite data. The navigation processor 107 uses the measurements and demodulated data from the verification/tracking track channels 106 to generate the navigation solution.

Figure 2:
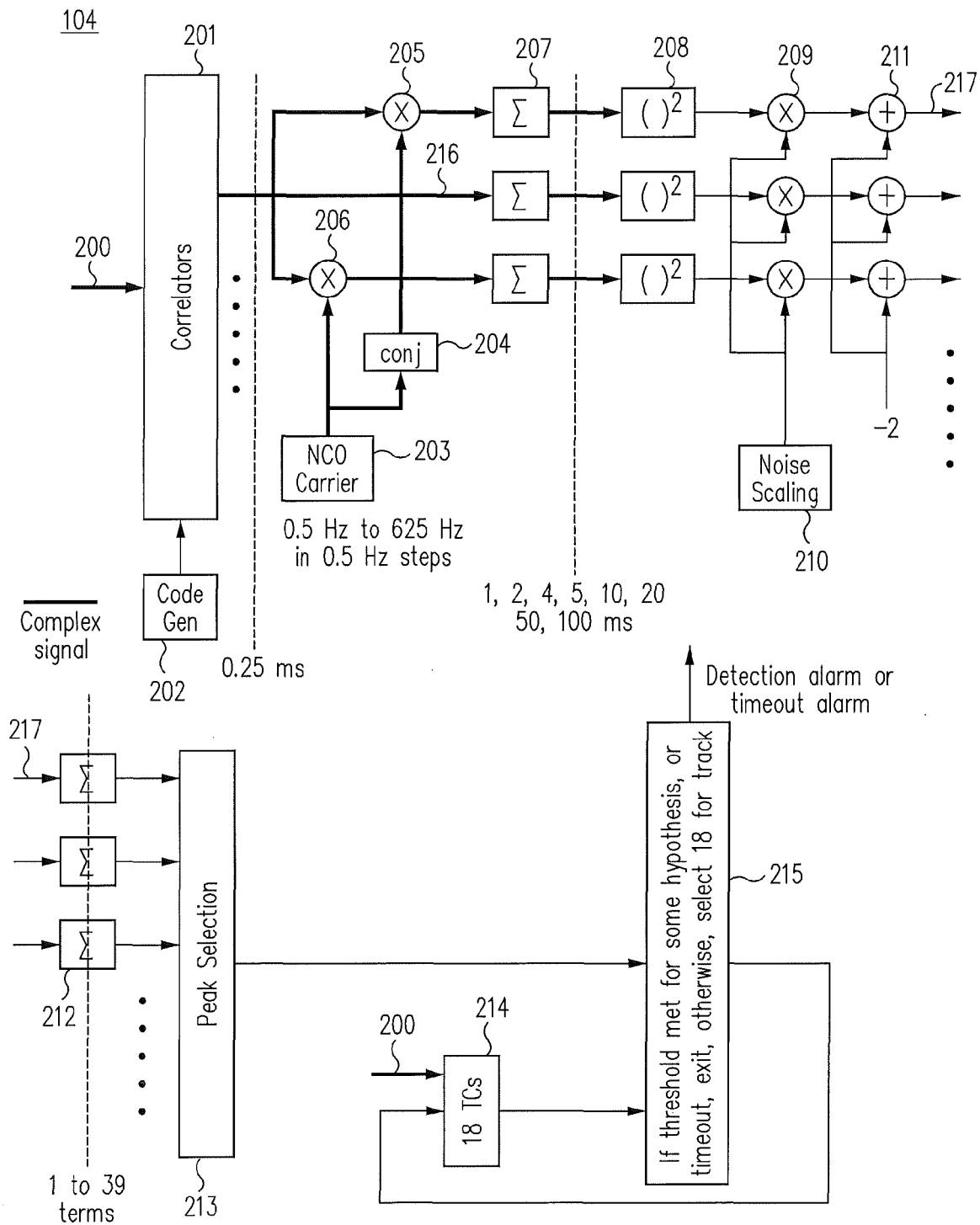
FIG. 2 shows a top level block diagram of sieving search module according to one or more embodiments of the present disclosure.

FIG. 2 shows a top level block diagram of the sieving search module of FIG. 1 according to one or more embodiments of the present disclosure. The sieving search module may include the sieving search channels (identifiers 201 through 213) and the sieving track channels 214. The sieving search channels perform the relatively short non-coherent integration for a group of hypotheses to accumulate the cross correlation energy of each hypothesis with the received satellite signal. At the end of the non-coherent integration period, the hypotheses with the 18 largest peaks from the non-coherent integration are identified as candidate hypotheses for further verification. The 18 peaks and the corresponding candidate hypotheses are transferred to the sieving track channels 214. The sieving track channels 214 remove Doppler frequency/code phase variation from the satellite signal so as to extend the non-coherent integration for the candidate hypotheses. In parallel, the sieving search channels start the non-coherent integrations for the next group of hypotheses. At the end of the non-coherent integration period for the next group of hypotheses, the 18 largest peaks of the non-coherent integration for this next group of hypotheses are identified. These 18 peaks are compared with the non-coherent integration from the 18 candidate hypotheses of the sieving track channels 214, and the hypotheses having the 18 largest of these 36 non-coherent integrations become the new candidate hypotheses. These new candidate hypotheses and their peaks are transferred to the sieving tracking channels 214 to replace the current candidate hypotheses. This process is repeated until one of the peaks exceeds a detection threshold, or the process times out.

Satellite navigation receivers divide the two-dimensional search space into multiple hypotheses when searching for satellite signals. Each hypothesis represents a unique combination of code phase offset and Doppler frequency. In FIG. 2, the sieving search channels may operate on 1536 hypotheses according to one or more embodiments of the present disclosure. The 1536 hypotheses are represented by the 512 correlators 201 which stores 512 correlations corresponding to different code phase offsets, where each code phase offset further encompasses 3 Doppler frequency offsets represented by the phase rotations of 205, 206. Code generator 202 generates the PN replica code of the satellite to be searched. The PN replica code from the code generator 202 may be shifted into the 512 correlators 201 at twice the chip rate so that successive code phase is offset by ½ chip. The 512 correlators 201 perform the cross correlation of the baseband signal 200 from the RF front end with 512 code phase offsets to generate 512 correlations. Each of the 512 correlations may be phase de-rotated by Doppler frequency offsets from the Doppler frequency search range to remove the Doppler frequency. The carrier NCO (Numerically Controlled Oscillator) 203 may be used to generate the Doppler frequency offsets from the Doppler frequency search range. For example, the carrier NCO 203 may generate Doppler frequency offsets from 0.5 Hz to 625 Hz in 0.5 Hz steps. The Doppler frequency offset from the carrier NCO 203 may also be conjugated by conj 204 to generate a Doppler frequency offset in the negative direction. Thus, the Doppler frequency search range may extend from −625 Hz to +625 Hz in 0.5 Hz steps. The output from the carrier NCO 203 and its conjugate may be used to phase de-rotate each of the 512 correlations in the phase rotators 206, 205, respectively. The outputs of the phase rotators 205, 206 along with the un-rotated correlation output 216 from the 512 correlators 201 yield correlations for 3 Doppler frequency offsets for each of the 512 code phase offsets. The 512 code phase offsets by 3 Doppler frequency offsets constitute 1536 hypotheses evaluations from the two-dimensional search space.

The accumulators 207 coherently integrate the correlations of each of the 1536 hypotheses for a coherent integration interval. Because coherent integration of the correlation may be degraded when there are uncompensated perturbations on the receiver clock frequency, the coherent integration interval may be restricted in its duration. For example, the coherent integration interval may be restricted to be 1, 2, 4, 5, 10, 20, 50, or 100 ms. However, these short coherent integration intervals may not allow for the cross correlation energy to be sufficiently built-up to yield reliable detection. Therefore, non-coherent integration, which does not use the phase information of the signal, is used to extend the cross correlation energy beyond the coherent integration interval. At the end of the coherent integration interval, the power approximator 208 calculates the power of the resulting coherent integration for each of the 1536 hypotheses. Power of the coherent integration over multiple coherent integration intervals is then integrated over a non-coherent integration interval and used for hypotheses' testing. The number of coherent integration intervals within the non-coherent integration interval is the number of non-coherent integrations, and is designated as $M_{NC}$.

Because hypotheses' testing may be performed on hypotheses with different $M_{NC}$, the cross correlation energy is computed as a log likelihood ratio and the hypotheses' testing is performed based on maximizing the log likelihood ratios of the hypotheses. A likelihood ratio is defined as a ratio of the conditional probability of the non-coherent integration measurement assuming the presence of signal to the conditional probability of the same non-coherent integration measurement assuming the absence of signal. The log likelihood ratio is the natural logarithm of the likelihood ratio. Thus, a log likelihood ratio of greater than 0 indicates that it's more likely than not that the non-coherent integration measurement results from the presence of signal. It can be shown that the log likelihood ratio may be approximated by subtracting from the non-coherent integration the product of 2 and $M_{NC}$, if the power of the coherent integration is scaled to unit noise variance at the output of the coherent integration. The product of 2 and $M_{NC}$ is also the expected non-coherent integration when there is no signal present. Therefore, the log likelihood ratio may be approximated by:

$$\text{Log Likelihood Ratio} \approx \sum_{1}^{M_{NC}} (x-2) \quad \text{(Equation 1)}$$

where x is the power of the coherent integration from the power approximator 108 scaled by the noise variance, and $M_{NC}$ is the number of non-coherent integrations.

Using Equation 1, the power of the coherent integration from the power approximator 208 is multiplied in the multipliers 209 by the noise scaling 210 for each of the 1536 hypotheses. The multiplication scales the power of the coherent integration to unit noise variance as required by the log likelihood ratio approximation. Noise variance may be estimated by several techniques. For example, a noise channel may be used to correlate the satellite signal with an unused PN code to generate a noise correlation and the noise variance estimated from the power of the coherent integration of the noise correlation integrated over the coherent integration interval. Alternatively, the noise variance may be estimated from the average of the power of the coherent integration obtained from the power approximators 208 for all 1536 hypotheses since the vast majority of the hypotheses are not seeing any signal. The noise scaling 210 may then compute the inverse of the estimated noise variance for multiplication with the output of the power approximator 208. The outputs from the multipliers 209 are subtracted by 2 in the adder 211 to generate the (x−2) term 217 of Equation 1 for each of the 1536 hypotheses. Up to $M_{NC}$ of the (x−2) terms 217 may be integrated by the non-coherent integrator 212 over the duration of the non-coherent integration interval for each of the 1536 hypotheses. As mentioned before, the size of $M_{NC}$ may be limited due to the deleterious effects of an uncompensated receiver clock frequency rate on the non-coherent integration over a long non-coherent integration interval. According to one or more embodiments of the present disclosure as shown in FIG. 1, $M_{NC}$ may be limited to 39. At the completion of the non-coherent integration interval, there will be 1536 non-coherent integration values representing 1536 log likelihood ratios. The peak selection 213 proceeds to select the 18 largest peaks from the 1536 non-coherent integration values. The hypotheses corresponding to the 18 largest peaks are then chosen as the candidate hypotheses for further verification by the sieving track channels 214. The sieving track channels 214 track the satellite signals to compensate for drift in the receiver clock frequency in addition to compensating for variations in Doppler frequency and code phase caused by the relative motion between the satellites and the navigation receiver. Tracking of the satellites allows the non-coherent integrations to be extended to allow further accumulation of the cross correlation energies.

After the candidate hypotheses for the 18 largest peaks are transferred to the sieving track channels 214, the sieving search channels may operate on the next 1536 hypotheses. As before, a coherent integration for each of the next 1536 hypotheses is performed for the coherent integration interval. Power of the coherent integration is integrated over the non-coherent integration interval to generate the log likelihood ratio for the 1536 hypotheses. The 18 largest peaks of the 1536 log likelihood ratios are selected. These 18 largest peaks are grouped with the 18 extended non-coherent integrations from the 18 tracking channels of the sieving track channels 214. The 18 largest peaks of the group of 36 non-coherent integrations are selected as the new peaks in 215. The hypotheses corresponding to the 18 new peaks are chosen as the new candidate hypotheses for further verification by the sieving track channels 214. The 18 new candidate hypotheses may consist of hypotheses from the current 1536 hypotheses in the sieving search channels and also from existing candidate hypotheses already in the sieving track channels 214 sieved from previous groups of hypotheses. Some of the existing candidate hypotheses that are not one of the 18 new candidate hypotheses may thus be replaced because the extended non-coherent integration for these candidate hypotheses may not be sufficiently built up. On the other hand, existing candidate hypotheses that contain the correct hypotheses may see their extended non-coherent integration increase such that these candidate hypotheses may still be part of the new candidate hypotheses and will be continually tracked until their non-coherent integration exceeds a detection threshold. The largest of the 18 new peaks is also selected as the peak log likelihood ratio to be compared to a detection threshold. Because the non-coherent integration is computed as the log likelihood ratio, the detection threshold is a modified detection threshold given by:

$$Tm = Th - 2M_{NC} \quad \text{(Equation 2)}$$

where Tm is the modified detection threshold to be compared against the peak log likelihood ratio, Th is the detection threshold derived from a desired probability of detection and a probability of false alarm computed as a function of SNR, and $M_{NC}$ is the number of non-coherent integrations used to compute the peak log likelihood ratio to be compared. Therefore, in order to generate Tm for a peak log likelihood ratio that may be selected from a candidate hypothesis in the sieving track channels 214, the sieving track channels 214 needs to keep track of the $M_{NC}$ for each of the track channels. If the peak log likelihood ratio exceeds Tm, detection is declared, the sieving search process is terminated, the 18 tracking channels of the sieving track channels 214 are released, and the candidate hypothesis associated with the largest peak is transferred to a verification tracking channel for verification. Otherwise, the 18 new candidate hypotheses are transferred to the sieving track channels 214 and the sieving search process continues. The sieving search module may continue to operate until either the largest of the log likelihood ratios exceeds the Tm, or until the total non-coherent integration interval reaches an allotted time-out period.

Figure 3:
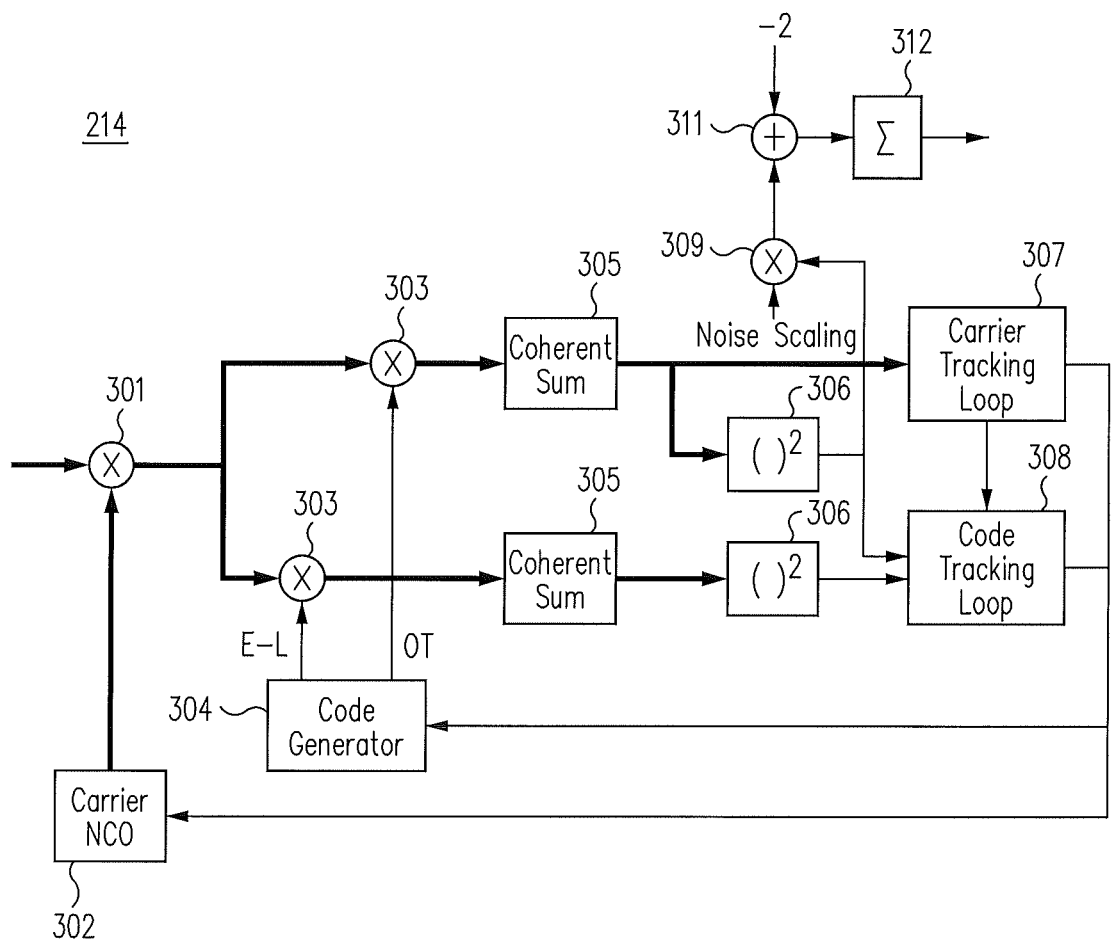
FIG. 3 shows a top level block diagram of sieving track channels according to one or more embodiments of the present disclosure.

FIG. 3 shows a top level block diagram of the sieving track channels of FIG. 2 according to one or more embodiments of the present disclosure. The sieving track channels extend the non-coherent integration of the 18 candidate hypotheses selected by the sieving search channels. Each sieving track channel is initialized with the code phase, carrier frequency, and non-coherent integration of a candidate hypothesis from the sieving search channel. For example, the carrier NCO 302 of the sieving track channels may be initialized with the carrier NCO 203 of the candidate hypotheses from the sieving search channels. Similarly, the code generator 304 of the sieving track channels may be initialized with the code generator 202 of the candidate hypotheses from the sieving search channels, and the non-coherent integration 312 of the sieving track channels may be initialized with the non-coherent integration 212 representing the log likelihood ratio of the candidate hypotheses from the sieving search channels. Each sieving track channel may implement a $1^{st}$ order code tracking loop 308 and a $2^{nd}$ order carrier tracking loop 307, with the carrier tracking loop 307 aiding the code tracking loop 308.

The received satellite signal is carrier phase de-rotated by the output of the carrier NCO 302 using the phase de-rotator 301. The output is then correlated with the E-L (early minus late) code phase or the OT (on time) code phase from the code generator 304 using the correlators 303 to generate the E-L correlation and the OT correlation, respectively. The E-L correlation and the OT correlation are coherently summed in the coherent sum 305 to generate the E-L coherent integration and the OT coherent integration, and the power of the coherent integrations approximated in the power approximator 306. The OT coherent integration is used by the $2^{nd}$ order carrier tracking loop 307 to track the carrier frequency. Additionally, the power of the OT coherent integration and the power of the E-L coherent integration are used by the $1^{st}$ order code tracking loop 308 to track the code phase with aiding from the carrier tracking loop 307. Similar to the sieving search channel, the power of the OT coherent integration is multiplied in the multiplier 309 by the noise scaling. The estimate of the noise variance for the noise scaling may be implemented using the same technique as that used in the sieving search channel. The output from the multiplier is subtracted by 2 in the adder 311 to generate the log likelihood ratio approximation. The log likelihood ratio approximation is then integrated in 312 over the duration of the non-coherent integration interval of the sieving search channel to extend the non-coherent integration of the candidate hypotheses. At the end of the non-coherent integration interval of the sieving search channel, the extended non-coherent integrations of the candidate hypotheses in the sieving track channels are compared with the non-coherent integrations from the sieving search channels to select the new candidate hypotheses for further verification. As mentioned before, the sieving track channels also need to keep track of the number of non-coherent integrations $M_{NC}$ for each track channel in order to generate the modified detection threshold Tm when a log likelihood ratio from the sieving track channel is selected as the peak for detection. $M_{NC}$ may be initially downloaded from the candidate hypothesis of the sieving search channel into a counter and then incremented by one every time the non-coherent integration of 312 is accumulated.

Although embodiments of the present disclosure have been described, these embodiments illustrate but do not limit the disclosure. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

We claim:

1. A sieving system for a satellite-based navigation receiver comprising:
    a plurality of sieving search channels adapted to non-coherently integrate one or more coherent integrations of a correlation of a satellite signal with a corresponding plurality of first hypotheses to generate a plurality of non-coherent integrations;
    a plurality of sieving track channels adapted to track the satellite signal to generate a plurality of tracked satellite signals and to non-coherently integrate one or more coherent integrations of a correlation of the plurality of tracked satellite signals with a corresponding plurality of second hypotheses to generate a plurality of extended non-coherent integrations; and
    a peak selection module adapted to compare the plurality of non-coherent integrations and the plurality of extended non-coherent integrations to select a plurality of candidate hypotheses corresponding to a plurality of largest peaks from the plurality of non-coherent integrations and the plurality of extended non-coherent integrations, wherein the plurality of candidate hypotheses updates the plurality of second hypotheses for the plurality of sieving track channels to extend the non-coherent integrations or the extended non-coherent integrations corresponding to the plurality of candidate hypotheses, and wherein the peak selection module selects a largest peak from the plurality of non-coherent integrations and the plurality of extended non-coherent integrations to compare with a detection threshold and to declare a detection of the satellite signal when the largest peak exceeds the detection threshold.

2. The sieving system of claim 1, wherein a search space comprises a plurality of groups of hypotheses, and the sieving search channels successively select each of the plurality of groups of hypotheses as the plurality of first hypotheses until the sieving search channels have selected all hypotheses contained in the search space.

3. The sieving system of claim 1, wherein a detection time for the satellite signal comprises a non-coherent integration interval of a sieving search channel and a non-coherent integration interval of a sieving track channel, and wherein the non-coherent integration interval of the sieving search channel is shorter than the non-coherent integration interval of the sieving track channel.

4. The sieving system of claim 1, wherein the plurality of non-coherent integrations comprises a plurality of log likelihood ratios for the plurality of first hypotheses, wherein a log likelihood ratio for a first hypothesis comprises the natural logarithm of a ratio of a probability of a non-coherent integration conditioned on a presence of the satellite signal to a probability of the non-coherent integration conditioned on an absence of the satellite signal.

5. The sieving system of claim 4, wherein each of the plurality of log likelihood ratios is approximated by an integration of the power of the coherent integration of the correlation of the satellite signal with a first hypothesis minus 2 over the duration of a non-coherent integration interval, wherein the coherent integration is scaled to unit noise variance at the output of an coherent integrator.

6. The sieving system of claim 4, wherein the plurality of extended non-coherent integrations comprises a plurality of log likelihood ratios for the plurality of second hypotheses, wherein a log likelihood ratio for a second hypothesis comprises the natural logarithm of a ratio of a probability of an extended non-coherent integration conditioned on a presence of the satellite signal to a probability of the extended non-coherent integration conditioned on an absence of the satellite signal.

7. The sieving system of claim 6, wherein the peak selection module compares the plurality of log likelihood ratios from the sieving search channels to select a plurality of the largest log likelihood ratios from the sieving search channels, compares the plurality of the largest log likelihood ratios from the sieving search channels with the plurality of log likelihood ratios from the sieving track channels, and selects a plurality of hypotheses corresponding to a plurality of the largest of said combined log likelihood ratios as the plurality of candidate hypotheses.

8. The sieving system of claim 1, wherein the peak selection module terminates the sieving search channels and the sieving track channels if the largest peak from the plurality of non-coherent integrations and the plurality of extended non-coherent integrations does not exceed the detection threshold after a search time-out interval.

9. The sieving system of claim 1, wherein the satellite-based navigation receiver further comprises a direct search system comprising:
    a plurality of direct search channels adapted to non-coherently integrate one or more coherent integrations of a correlation of the satellite signal with a corresponding plurality of direct search hypotheses to generate a plurality of direct search non-coherent integrations; and
    a peak detect module adapted to compare the plurality of direct search non-coherent integrations with a direct search detection threshold and to declare a detection of the satellite signal when a direct search non-coherent integration exceeds the direct search detection threshold.

10. The sieving system of claim 9, wherein the satellite-based navigation receiver is further adapted to operate the sieving system when the satellite signal has a signal to noise ratio less than a target value, and to operate the direct search system otherwise.

11. A method for searching for a satellite signal in a sieving mode in a satellite-based navigation receiver comprising:

non-coherently integrating one or more coherent integrations of a correlation of the satellite signal with a plurality of first hypotheses to generate a plurality of non-coherent integrations;

tracking the satellite signal to generate a plurality of tracked satellite signals;

non-coherently integrating one or more coherent integrations of a correlation of the plurality of tracked satellite signals with a plurality of second hypotheses to generate a plurality of extended non-coherent integrations;

comparing the plurality of non-coherent integrations and the plurality of extended non-coherent integrations to select a plurality of candidate hypotheses corresponding to a plurality of largest peaks from the plurality of non-coherent integrations and the plurality of extended non-coherent integrations;

updating the plurality of second hypotheses with the plurality of candidate hypotheses to extend the non-coherent integrations or the extended non-coherent integrations corresponding to the plurality of candidate hypotheses;

selecting a largest peak from the plurality of non-coherent integrations and the plurality of extended non-coherent integrations to compare with a detection threshold; and declaring a detection of the satellite signal when the largest peak exceeds the detection threshold.

12. The method of claim 11, further comprising dividing a search space into a plurality of groups of hypotheses, and selecting successively each of the plurality of groups of hypotheses as the plurality of first hypotheses until the satellite signal has been searched with all groups of hypotheses.

13. The method of claim 11, wherein a detection time for the satellite signal comprises a non-coherent integration interval for the plurality of non-coherent integrations and an extended non-coherent integration interval for the plurality of extended non-coherent integrations, and wherein the non-coherent integration interval is shorter than the extended non-coherent integration interval.

14. The method of claim 11, wherein the plurality of non-coherent integrations comprises a plurality of log likelihood ratios for the plurality of first hypotheses, wherein a log likelihood ratio for a first hypothesis comprises the natural logarithm of a ratio of a probability of a non-coherent integration conditioned on a presence of the satellite signal to a probability of the non-coherent integration conditioned on an absence of the satellite signal.

15. The method of claim 14, wherein each of the plurality of log likelihood ratios is approximated by a method comprising:

coherently integrating correlation of the satellite signal with a first hypothesis for the duration of a coherent integration interval to generate the coherent integration;

taking a power of the coherent integration to generate an estimated power of the coherent integration;

coherently integrating the noise for the duration of the coherent integration interval to estimate the unit noise variance;

scaling the estimated power of the coherent integration with the unit noise variance to generate a scaled estimated power of the coherent integration;

subtracting 2 from the scaled estimated power of the coherent integration to generate a bias-removed scaled estimated power of the coherent integration; and integrating the bias-removed scaled estimated power of a plurality of coherent integrations over the duration of a non-coherent integration interval to approximate the log likelihood ratio.

16. The method of claim 14, wherein the plurality of extended non-coherent integrations comprises a plurality of log likelihood ratios for the plurality of second hypotheses, wherein a log likelihood ratio for a second hypothesis comprises the natural logarithm of a ratio of a probability of an extended non-coherent integration conditioned on a presence of the satellite signal to a probability of the extended non-coherent integration conditioned on an absence of the satellite signal.

17. The method of claim 16, wherein said updating the plurality of second hypotheses with the plurality of candidate hypotheses comprises:

comparing the plurality of log likelihood ratios for the plurality of first hypotheses to select a plurality of the largest log likelihood ratios for the plurality of first hypotheses;

comparing the plurality of the largest log likelihood ratios for the plurality of first hypotheses with the plurality of log likelihood ratios for the plurality of second hypotheses; and selecting a plurality of hypotheses corresponding to a plurality of the largest of said combined log likelihood ratios as the plurality of candidate hypotheses to update the plurality of second hypotheses.

18. The method of claim 11, further comprising terminating searching for the satellite signal if the largest peak from the plurality of non-coherent integrations and the plurality of extended non-coherent integrations does not exceed the detection threshold after a search time-out interval.

19. The method of claim 11, further comprising searching for the satellite signal in a direct mode comprising:

non-coherently integrating one or more coherent integrations of a correlation of the satellite signal with a plurality of hypotheses to generate a plurality of direct search non-coherent integrations;

comparing the plurality of direct search non-coherent integrations with a direct search detection threshold; and declaring a detection of the satellite signal when a direct search non-coherent integration exceeds the direct search detection threshold.

20. The method of claim 19, further comprising operating the sieving mode when the satellite signal has a signal to noise ratio less than a target value, and operating the direct mode otherwise.

* * * * *